United States Patent [19]
Dillat

[11] Patent Number: 6,139,193
[45] Date of Patent: Oct. 31, 2000

[54] DEVICE FOR CONNECTING TWO OR MORE MULTIWIRE CABLES

[75] Inventor: Michel Dillat, Courbevoie, France

[73] Assignee: Pouyet, S.A., France

[21] Appl. No.: 09/155,754

[22] PCT Filed: Apr. 2, 1997

[86] PCT No.: PCT/FR97/00589

§ 371 Date: Oct. 2, 1998

§ 102(e) Date: Oct. 2, 1998

[87] PCT Pub. No.: WO97/38337

PCT Pub. Date: Oct. 16, 1997

[30] Foreign Application Priority Data

Apr. 5, 1996 [FR] France ................................. 96 04368

[51] Int. Cl.[7] .................................................. G02B 6/38
[52] U.S. Cl. ................................. 385/55; 385/54; 385/59
[58] Field of Search .................................. 385/54, 55, 59, 385/71, 139

[56] References Cited

U.S. PATENT DOCUMENTS 5,444,810  8/1995  Szegda .................................... 385/139

Primary Examiner—Phan T. H. Palmer
Attorney, Agent, or Firm—Richard P. Gilly

[57] ABSTRACT

The connecting device includes a drum (3) and two means (4) for securing wire bundles of the cables to be connected. Said securing means (4) are generally symmetrically positioned on either side of the drum (3), substantially coaxially therewith, and the drum (3) carries members for positioning the connection means at uniformly distributed locations adjacent its periphery.

11 Claims, 4 Drawing Sheets

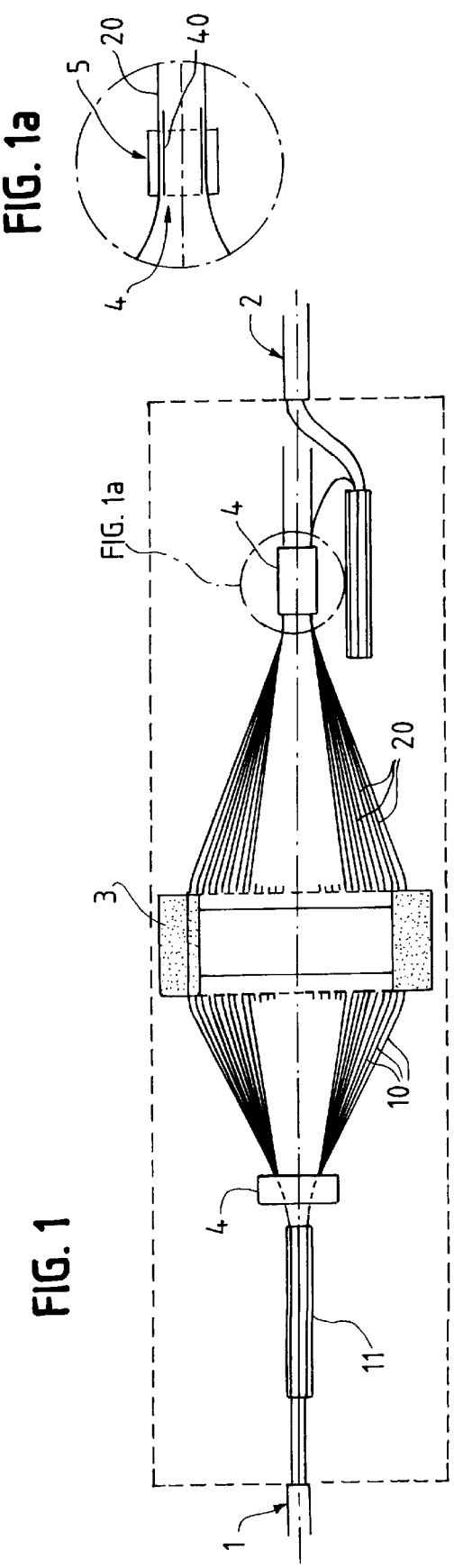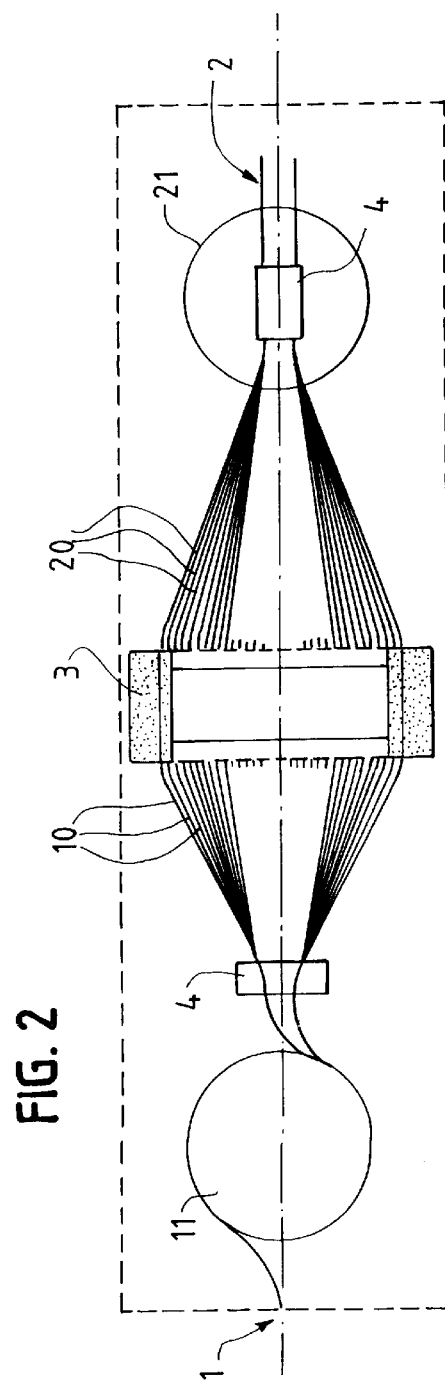

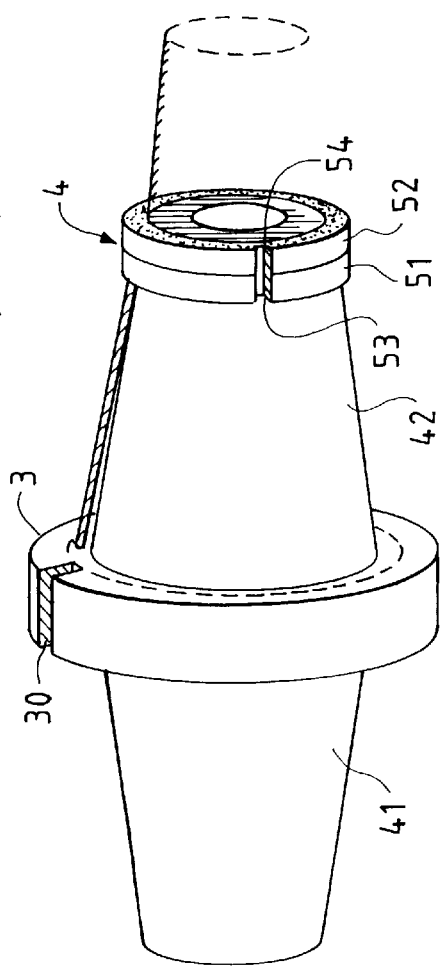
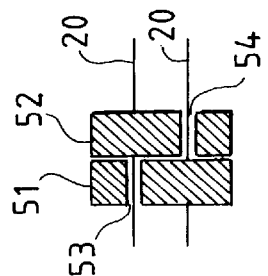
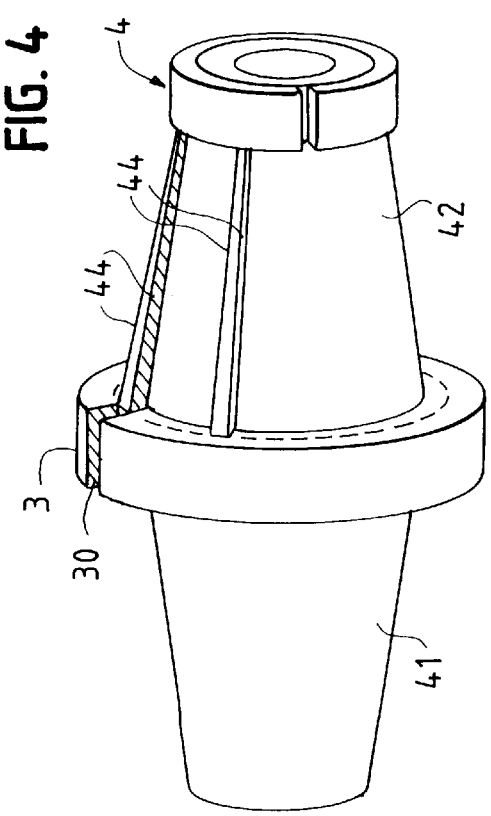
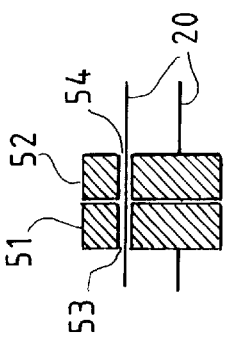

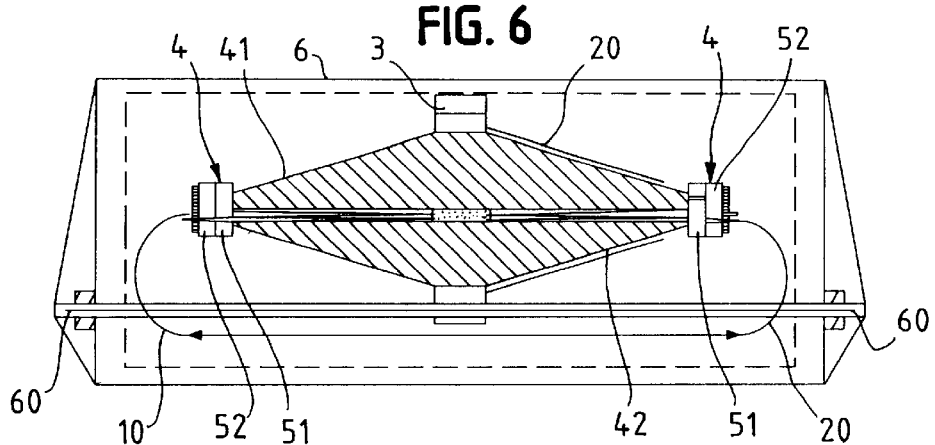
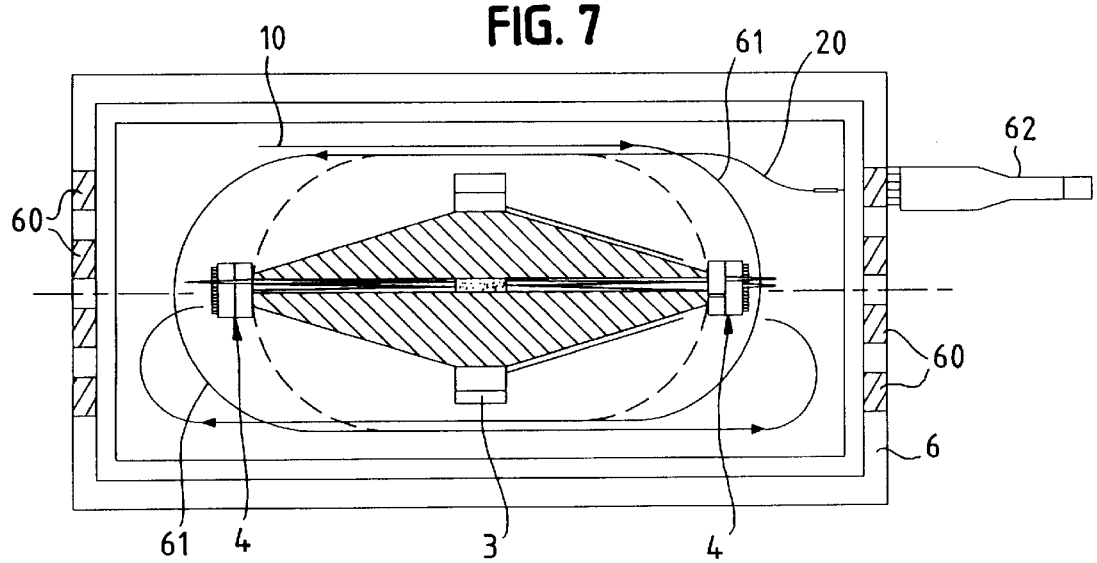
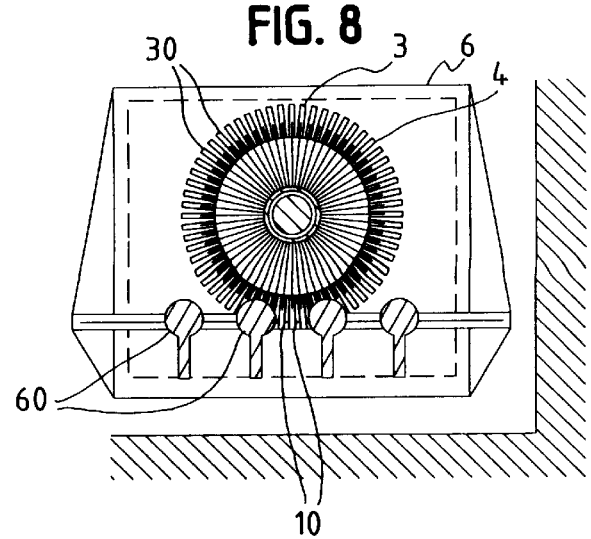

DEVICE FOR CONNECTING TWO OR MORE MULTIWIRE CABLES

FIELD OF THE INVENTION

The present invention generally relates to a device for connecting multiwire cables.

BACKGROUND OF THE INVENTION

Such devices are used to ensure join of cables disposed one after the other so as to connect two points of a line, even ones which are very remote. These devices are employed for all types of coaxial or optical cables, for example made of copper.

The connecting device according to the invention is more particularly, but not exclusively, intended for connecting multiwire optical cables for which it is necessary to observe particular wiring rules due to the fragility of the optical fibers composing them, to the reserve of optical fibers, to the respect of the minimum radii of curvature, etc . . . .

Multiwire cables are composed of a plurality of wires, copper wire or optical fiber for example, each transmitting information, data or current. The connection of two multiwire cables requires the connection of each wire of the upstream cable to a corresponding wire of the downstream cable.

Such a connecting device may, in manner known per se, ensure connection of a plurality of cables disposed upstream to a plurality of cables disposed downstream, the total number of the wires presented upstream having to be equal to the total number of the wires presented downstream.

The connection of these wires is effected by connection means of any type known per se, for example by a splice or a connector.

SUMMARY OF THE INVENTION

The connection of the optical cables is generally effected at the present time with the aid of devices comprising elements, called coiling cassettes, disposed side by side. Each coiling cassette ensures coiling and connection of one or more optical fibers of the optical cables upstream and downstream.

The coiling cassettes are mounted to move in rotation about an axis in order to allow the user to displace them like the pages of a book to have access to the cassette containing the fiber or fibers on which he wishes to intervene.

These devices are fastidious and slow to use since it is necessary upon each intervention to pivot the cassettes one by one to render the cassette containing the sought after fiber or fibers accessible.

Moreover, these devices present the drawback of requiring the fibers to be cut to largely different lengths, varying as a function of the position of the cassette on which they are taken over.

One can also cite document DE-A-3627599 which concerns a connection device for two high-voltage electrical cables, and the core of which is constituted by a plurality of wires. These wires are interconnected, without being separated or spaced apart, by means of a crimp connection. In contrast, the shielding wires of this cable are connected to each other individually by means of separate connectors. They are maintained in a separated apart and parallel position in relation to each other by support and spacing elements. In such a device, the conductive wires per se are connected by a central crimp connector, without any lateral spacing apart or separation.

The invention proposes to overcome the different drawbacks of the known devices by providing a connecting device of reduced dimensions which is particularly easy to use.

To that end, the invention relates to a device for connecting at least two multiwire cables, in which each wire of a cable disposed upstream is connected to a wire of a cable disposed downstream by a connecting means, for example a splice or a connector, characterized in that:

it is composed of a drum and two means for securing the wire bundles of the cables to be connected, said securing means are positioned on either side of the drum overall in symmetrical manner and substantially on the same axis as said drum, the drum bears, at regularly distributed points near its periphery, means for positioning said connection means, these positioning means are mounted in rotation about the longitudinal axis of the drum, either by rotation means supporting this drum or by at least one ring mounted in rotation in relation to the drum, with the result that the wires maintained by the securing means and disposed in a connection means borne by the drum, form on either side of the drum two conical laps of wires having a securing means for focus, and that these connection means are accessible the one after the other by simple rotation of their positioning means about the axis of the drum, and that these connection means are accessible the one after the other by simple rotation of their positioning means about the longitudinal axis of the drum.

The connecting device according to the invention is further noteworthy in that:

the drum is cylindrical in shape, the drum has the general shape of a disc whose thickness is adapted to the dimensions of the connection means, the securing means are each constituted by a ring ensuring hold of the wires in a bundle, the securing means comprise a hub around which are disposed, side by side, the wires of the cable to be connected and a holding means retaining said wires in position around the hub, the holding means are constituted by two rings mounted to move in rotation around the hub, disposed against each other and each presenting a slot so that it is possible to insert the wires between the rings and the axial hub when the slots are aligned, while the withdrawal of said wires is avoided by rotating one of the rings with respect to the other to move the slots apart in the circumferential direction, the positioning means are notches made on the periphery of the drum, the securing means are positioned on a common hub which also bears the drum, for example constituted by a tube of constant diameter, the hub of each securing means is constituted by a conical element positioned with its end of larger diameter against the drum and bearing the wire-holding means at its end of smaller diameter, the hub bears fins between which the wires are disposed.

DESCRIPTION OF THE DRAWINGS

The invention will be more readily understood thanks to the following description given by way o-limiting example with reference to the accompanying drawings, in which:

FIG. 1 is a schematic side view of an embodiment of a device according to the invention and comprises an enlarged view of a detail.

FIG. 2 is a plan view of the device shown in FIG. 1.

FIG. 3 is a view in perspective of a second embodiment of a device according to the invention.

FIG. 4 is a view in perspective of a variant embodiment of a device of FIG. 3.

FIGS. 5a and 5b show an embodiment of the holding means.

FIG. 6 is a schematic view of a cable connection sleeve employing the device of FIG. 3.

FIG. 7 is a schematic view of the sleeve of FIG. 6, with the cover removed.

FIG. 8 is a side view of the sleeve of FIG. 6.

DETAILED DESCRIPTION OF THE INVENTION

Figure 9:
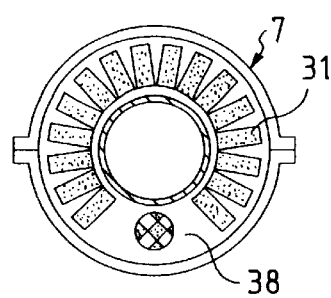
FIGS. 9 to 13 show embodiments of the drum of the connecting device according to the invention intended for connecting conventional cables, namely, respectively, cables containing 128, 248, 496, 376 and 512 optical fibers.

As shown in FIGS. 1 and 2, a connecting device allows the connection of an upstream cable 1 to a downstream cable 2 and is usually positioned in a connection sleeve schematically shown in FIG. 1 by the frame drawn in fine broken lines in which it is hermetically enclosed.

In manner known per se, the connecting device may ensure connection of one or more cables disposed upstream to one or more cables disposed downstream, the total number of wires disposed upstream having to be equal to the number of wires disposed downstream.

The device according to the invention may be employed for connecting multiwire cables of any type, made of copper, coaxial or optical.

In manner known per se, the multiwire cables are composed of a plurality of wires. In the case of an optical cable, which we are considering by way of example in the present description, the optical fibers are either disposed in bundles of unitary fibers or of microsheaths within the sheath of the cable, or connected in bands in which two, four, six or eight fibers are disposed parallel to one another.

For their connection, the cables 1 and 2 are flared out in unitary elements composed of individual fibers, microsheaths or bands depending on the type of cable used.

By way of example, we shall consider in the present description the use of the device for connecting optical cables 1 and 2 formed by bands 10 and 20, these bands are a form of embodiment of the wires of a multiwire cable.

The bands 10 and 20 released from the sheath of the cables are coiled on discs 11, 21 so as To have available a reserve of optical fibers with a view to possible modifications of the Connections.

The connecting device according to the invention is composed of a drum 3 and two means 4 for securing the bundles of wires of the upstream cable and of the downstream cable, respectively.

The drum 3 is cylindrical in form and presents a circular cross-section in the embodiment shown in the drawings. This drum has the general form of a disc whose thickness is adapted to the dimensions of the connection means employed, i.e. of the order of some centimeters. It may be constituted by a thick, solid or hollow disc, or by a ring. It may also be constituted by two plane faces disposed parallel to one another and connected by a ring of material whose diameter is equal to or smaller than the diameter of the two plane faces.

Said securing means 4 are positioned on either side of the drum 3, overall symmetrically, being disposed substantially on the same axis as said drum 3.

The bundle of bands 10, 20 issuing from the cables 1 and 2 are respectively positioned in one of the securing means 4.

It is possible to use securing means 4 which are simply constituted by a ring ensuring hold of the bands in a bundle.

Said securing means preferably comprise a hub 40 around which are disposed the bands of optical fibers side by side, and a holding means 5 retaining said bands in position around the hub.

These holding means 5 may be constituted by fast-tightening rings, dismountable or not.

The drum 3 bears, at regularly distributed points near its periphery, positioning means allowing positioning and hold of the bands 10 and 20 or connection means; these positioning means are not shown in FIGS. 1 and 2.

By way of example, if the connection of optical fibers must be effected by a splice, a drum 3 presenting two outer plane faces whose diameter is larger than that of the ring which connects them, is used. The positioning means are in that case provided in each of the faces so as to retain the bands 10 and 20. These bands flare out so as to release the individual fibers on which splices are made in the space located between said plane faces.

If the connection is to be effected with the aid of a connector, it is possible to use the same type of drum, with projecting plane faces bearing means for positioning the bands of fibers, the connectors being fixed to the ring, or to use a drum without projecting faces, on the periphery of which positioning means have been provided, ensuring hold of said connectors.

Simple to make, these positioning means may be notches 30 made on the periphery of the drum.

Any type of inscription, figure, letter or sign, may be printed near the notches on one and/or the other of the faces of the drum, so as to allow the wires to be located.

When each band is to be positioned and held on the drum, V-notches of small opening are formed, at the bottom of which the bands may be wedged.

When the positioning means must ensure positioning of connectors, the dimensions and shape of the notches 30 are adapted to the conformation of the connector.

An embodiment of such a notch 30 intended for positioning a connector is shown in FIG. 3; this notch is of square cross-section.

Such notches 30 are provided over a large part of the periphery of the drum.

The bands 10, 20 held by the securing means 4 are disposed one by one in a notch of the drum 3 or in a connector borne by this drum. On doing so, a conical lap of bands having a securing means 4 for focus is produced on either side of the drum.

It is, of course, possible to make the connection of the optical fibers before positioning the bands, or the connectors, in the positioning means of the drum.

The connecting device according to the invention offers an easy access to the connections, as the latter are distributed over a circumference disposed around the axis on which the fibers are secured.

This connecting device uses bands having virtually identical lengths, which avoids all the drawbacks due to the necessity of cutting the bands to different lengths as a function of the location in which their connection is made, such drawbacks being known with the devices employing coiling cassettes.

According to an embodiment, not shown in the drawings, the securing means 4 are positioned on a common hub 40 which also bears the drum 3.

A tube of constant diameter may constitute a simple form of embodiment of such a hub 40.

FIG. 3 shows a variant embodiment in which the hubs of each securing means are constituted by a conical element 41, 42, each of these conical elements being positioned with its end of larger diameter against the drum 3 and bearing the band-holding means at its end of smaller diameter; only one holding means is shown in FIG. 3.

The diameter of the end positioned against the drum of each conical element is, as shown in the drawing, smaller than the bottom diameter of the notches 30, so as to leave the necessary space for positioning the connectors around said conical elements.

Such a form of embodiment makes it possible to limit the possibility of displacement of the bands in the direction of the axis of the device so as to reduce the risks of said bands breaking.

In fact, if FIGS. 1 and 2 are considered again, it is seen that, near the securing means 4, the bands are close to one another, while they move away from one another as the drum is approached. Such spacing apart of the bands renders them vulnerable if, by accident, an object strikes them.

The embodiment of the hub in two conical elements enables a device to be proposed in which the bands are always disposed at a short distance from a rigid surface. If by accident an object strikes or pushes a band, the deformation thereof is limited by its abutment against the wall of the hub and the rupture of this band is avoided.

In the embodiment of FIG. 4, the hub bears fins (of which four have been shown on part 42) between which the bands 10, 20 are disposed.

This form of embodiment allows an even better protection of the bands which are disposed inside the space defined by the fins and therefore inaccessible from the outside.

It is, of course, possible to make similar fins on a common tubular hub.

Such an embodiment of the common hub with a tubular inner body and triangular fins of which the upper part is against the drum 3, makes it possible to position each band in a fairly large volume to allow the formation of an additional reserve of band. In fact, it is possible to position the band loosely between the securing means 4 and the drum 3 or even to form one or more loops of bands which are disposed between the fins 44. This additional reserve allows the modification of the connection of the band at the level of the drum 3 without it being necessary to remove the band from the securing means and repositioning it after having displaced it in the direction of the drum.

FIGS. 5a and 5b show a particularly simple and efficient embodiment of the holding means 5.

This holding means 5 is constituted by two rings 51 and 52 mounted to move in rotation on the hub, disposed against each other and each presenting a slot 53, 54.

When the rings are disposed as shown in FIGS. 3 and 5b, with the slots 53, 54 aligned, it is possible to insert the bands between the rings 51, 52 and the axial hub 40. When all the bands are inserted, it suffices, to prevent the withdrawal of said bands, to rotate one of the rings with respect to the other to move the slots 53, 54 apart in the circumferential direction, as shown in FIG. 5a.

FIGS. 6 to 8 illustrate the use of a connecting device according to the invention in a cable connection sleeve 6. In this example, the cable connection sleeve is constituted by an overall parallelepipedic box presenting on each of its end faces four passages 60 for cables such as 62. The connecting device may thus be employed for connecting from one to four cables disposed upstream to one to tour cables disposed downstream.

These Figures schematically show the arrangement of the bands in loops 61, making it possible to create fairly large reserves of bands without requiring the use of coiling discs such as the discs 21 and 11 of FIGS. 1 and 2.

An embodiment of the different notches allowing positioning of the bands, or connectors, on the drum 3 is visible in FIG. 8.

FIGS. 9 to 13 show embodiments of the drum 3 depending on the constitution of the cables for five conventional dimensions of the cables.

These drums are shown in cylindrical connection sleeves 7.

In these embodiments, the positioning means 30 are borne by one or more rings disposed on the periphery of the drum.

The drum shown in FIG. 9 is intended for the connection of cables comprising 128 optical fibers distributed in 16 bands of 8 fibers. In this embodiment, the ring 31 occupies only a portion of the periphery of the drum, a space 38 remaining free and allowing passage of cables.

Figure 10:
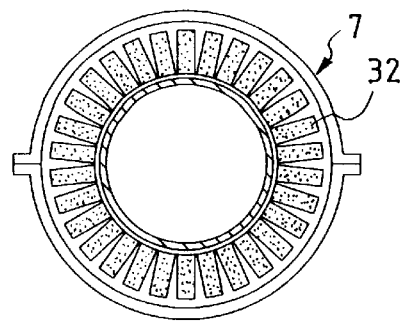

The drum shown in FIG. 10 is intended for the connection of cables comprising 248 optical fibers distributed in 31 bands of 8 fibers, the drum bearing the ring 32 presenting 31 notches.

Figure 11:
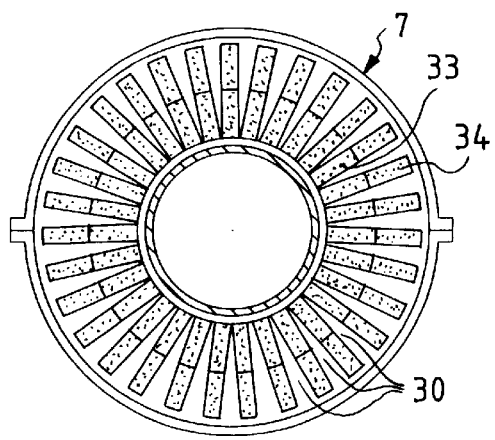

The drum shown in FIG. 11 is intended for the connection of cables comprising 496 optical fibers distributed in 62 bands of 8 fibers. In this embodiment, the drum bears two rings 33 and 34 provided with notches 30. The bands are firstly positioned in the notches of the inner ring 33, positioning the notches of the ring 34 in register with those of the ring 33 as shown in the drawing. The ring 34 is then rotated so as to close the notches of the ring 33, then bands are positioned in the notches of this ring 34. The bands are then positioned on two conical laps while remaining easily accessible from the outside.

Figure 12:
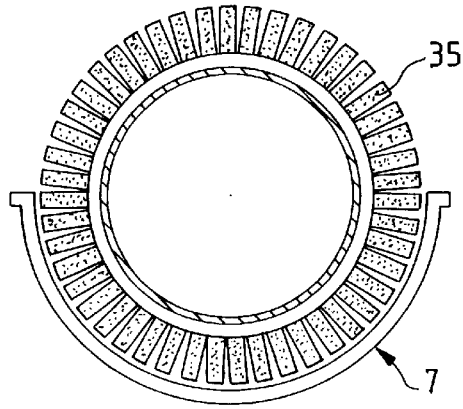

The drum shown in FIG. 12 is a drum of the same structure as that of FIG. 10 but bears a ring 35 allowing the connection of cables comprising 376 optical fibers distributed in 47 bands of 8 fibers.

Figure 13:
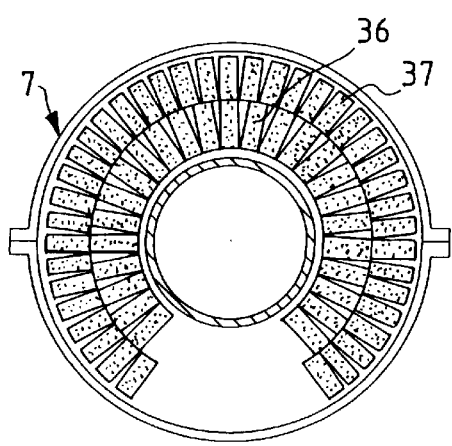

The drum shown in FIG. 13 is intended for the connection of cables comprising 512 optical fibers distributed in 64 bands of 8 fibers. This drum is of the same type as that of FIG. 11 and comprises two rings 36, 37. The notches of the outer ring are closed at their inner end. The rings occupy only a portion of the circumference of the drum. It is then possible to remove the outer ring 37 by elastic deformation to position the bands in the notches of the ring 36, then to replace this ring 37 in order to position the bands in its notches.

It will be noted that, in the device according to the invention, access to any connection between two wires is obtained very simply by rotating the drum about its axis, or by rotating the drum and the securing means, the bands being positioned loosely between the drum and said securing means or between said securing means and the ends of the sheaths of the cables. It is, of course, possible, in the case of the drum bearing a ring, to ensure a simple rotation of this ring with respect to the central part of the drum.

The device according to the invention is also particularly interesting in that it offers the possibility of making the connections automatically with the aid of a machine on which the drum is driven in rotation step by step. Means for locating the position of the drum may be used to facilitate automatization.

Although the drum of the device according to the invention has been described as being of circular cross-section, the present invention would not be exceeded by providing a drum of any cylindrical shape in the broad sense of the term, having any other cross-section, for example ellipsis, rhombus, etc.

What is claimed is:

1. Device for connecting at least two multiwire cables (1, 2) in which each wire of a cable disposed upstream is connected to a wire of a cable disposed downstream by a connection means, characterized in that:

it is composed of a drum (3) and two means (4) for securing the wire bundles of the cables to be connected, said securing means (4) are positioned on either side of the drum (3) overall in symmetrical manner and substantially on the same axis as said drum (3), the drum (3) bears, at regularly distributed points near its periphery, means (30) for positioning said connection means, these positioning means (30) are mounted to rotate about the longitudinal axis of the drum (3), either by rotation means supporting this drum (3), or by at least one ring (33, 34) mounted to rotate with respect to the drum (3), with the result that the wires maintained by the securing means (4) and disposed in a connection means borne by the drum (3), form on either side of the drum two conical laps of wires having a securing means (4) for focus, and these connection means are accessible one after the other by simple rotation of their positioning means (30) about the longitudinal axis of the drum (3).

2. Connecting device according to claim 1, characterized in that said securing means (4) comprise a hub (40) around which are disposed, side by side, the wires of the cable to be connected and a holding means (5) retaining said wires in position around the hub (40).

3. Connecting device according to claim 2, characterized in that the holding means (5) are constituted by two rings (51, 52) mounted to move in rotation on the hub, disposed against each other and each presenting a slot (53, 54) so that it is possible to insert the wires between the rings (51, 52) and the axial hub (40) when the slots (53, 54) are aligned, while the withdrawal of said wires is avoided by rotating one of the rings with respect to the other to move the slots (53, 54) apart in the circumferential direction.

4. Device according to claim 5, characterized in that the hub (40) of each securing means (4) is constituted by a conical element (41, 42) positioned with its end of larger diameter against the drum (3) and bearing the wire-holding means (5) at its end of smaller diameter.

5. Connecting device according to claim 1, characterized in that the securing means (4) are positioned on a common hub (40) which also bears the drum (3), for example constituted by a tube of constant diameter.

6. Connecting device according to claim 5, characterized in that the hub (40, 41, 42) bears fins (44) between which the wires are disposed.

7. Connecting device according to claim 1, characterized in that the positioning means (30) are notches made on the periphery of the drum.

8. Connecting device according to claim 1, characterized in that the drum (3) is cylindrical in shape.

9. Connecting device according to claim 1, characterized in that the drum (3) has the general shape of a disc whose thickness is adapted to the dimensions of the connection means.

10. Connecting device according to claim 1, characterized in that the securing means (4) are each constituted by a ring ensuring hold of the wires in a bundle.

11. A connecting device according to claim 1, wherein said connection means is one of a splice and a connector.

* * * * *